(12) United States Patent
Matsuzaki et al.

(10) Patent No.: US 6,758,890 B2
(45) Date of Patent: Jul. 6, 2004

(54) AQUEOUS INK AND PROCESS FOR PRODUCING DYE

(75) Inventors: Yoriaki Matsuzaki, Fukuoka (JP); Kenichi Fujii, Chiba (JP); Osamu Kohgo, Chiba (JP); Hiroshi Naruse, Chiba (JP); Tsutami Misawa, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 92 days.

(21) Appl. No.: 10/088,352

(22) PCT Filed: Jul. 16, 2001

(86) PCT No.: PCT/JP01/06126
§ 371 (c)(1),
(2), (4) Date: Mar. 15, 2002

(87) PCT Pub. No.: WO02/06409
PCT Pub. Date: Jan. 24, 2002

(65) Prior Publication Data
US 2003/0079648 A1 May 1, 2003

(30) Foreign Application Priority Data

Jul. 17, 2000 (JP) ........................ 2000-216066
Nov. 2, 2000 (JP) ........................ 2000-335427

(51) Int. Cl.$^7$ ................ C09D 11/02; C09B 20/09
(52) U.S. Cl. ................................ 106/31.48; 534/797
(58) Field of Search ................ 106/31.48; 534/797

(56) References Cited

U.S. PATENT DOCUMENTS

| | | | |
|---|---|---|---|
| 5,843,217 A | | 12/1998 | Ueda et al. |
| 5,925,746 A | * | 7/1999 | Lauk et al. .............. 534/634 |
| 6,319,290 B1 | * | 11/2001 | Kalweit et al. .............. 8/549 |
| 6,365,719 B1 | * | 4/2002 | Lehr .......................... 534/691 |
| 6,432,185 B1 | * | 8/2002 | Bauer et al. ............ 106/31.48 |
| 6,506,241 B1 | * | 1/2003 | Stocks et al. ........... 106/31.48 |
| 6,610,132 B1 | * | 8/2003 | Wight ..................... 106/31.48 |

FOREIGN PATENT DOCUMENTS

| | | |
|---|---|---|
| EP | 325041 A2 | 7/1989 |
| EP | 953613 A2 | 11/1999 |
| JP | 60-177081 A | 9/1985 |
| JP | 6-191138 A | 7/1994 |
| JP | 10-176129 A | 6/1998 |
| JP | 2000-178463 A | 6/2000 |
| WO | WO 94/16021 A1 | 7/1994 |
| WO | WO 00/15723 A2 | 3/2000 |

* cited by examiner

Primary Examiner—Helene Klemanski
(74) Attorney, Agent, or Firm—Burns, Doane, Swecker & Mathis, L.L.P.

(57) ABSTRACT

Aqueous ink for ink jet recording comprising a coloring matter and an aqueous medium, in which at least one of dyes represented by the formula (A) or a salt thereof is contained as the coloring matter

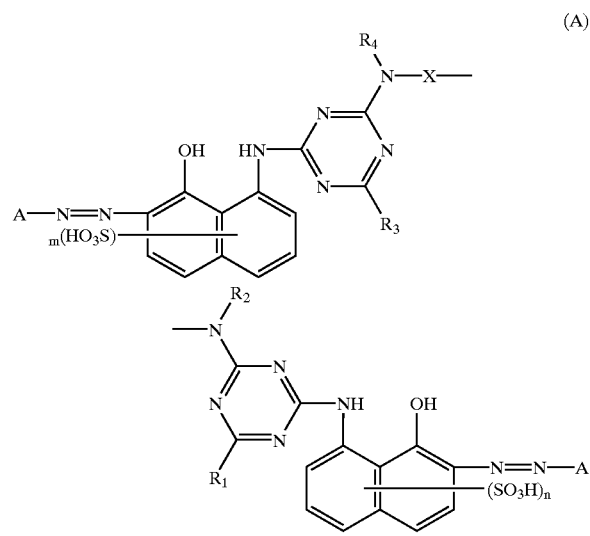

wherein $R_1$ and $R_3$, independently from each other, represent a hydrogen atom, an optionally substituted alkyl group, an optionally substituted alkoxy group, an amino group, a hydroxyl group or a halogen atom, $R_2$ and $R_4$, independently from each other, represent a hydrogen atom, an optionally substituted alkyl group, an optionally substituted aryl group or an aralkyl group, A represents an optionally substituted phenyl group or naphthyl group, X represents a divalent bonding group free from a saturated carbon ring, and m and n, independently from each other, represent an integer of 1 to 4.

25 Claims, No Drawings

AQUEOUS INK AND PROCESS FOR PRODUCING DYE

TECHNICAL FIELD

The present invention relates to aqueous ink containing a dye, especially aqueous ink suitable for an ink jet recording system, and a simple process for producing a dye.

BACKGROUND OF THE INVENTION

Aqueous ink used in writing instruments or for recording of an ink jet recording system is basically made of a dye, water and an organic solvent. In consideration of an odor and safe to the human body and the surrounding environment, aqueous ink containing water as a main solvent has been in high demand, and acid dyes, direct dyes and the like which are soluble in water have been actually used. In this connection, various characteristics are required for dyes and aqueous ink.

Especially, with respect to aqueous ink used in a recording liquid of an ink jet recording system, the following various characteristics are required. However, all these characteristics have not been satisfied at present.

(1) Physical properties such as viscosity, surface tension, specific conductivity, density, pH and the like of ink are appropriate.

(2) Long-term storage stability of ink is good.

(3) Dissolution stability of a soluble component is high and clogging of a nozzle does not occur.

(4) Quick-drying property of a recording medium is good.

(5) A recorded image is sharp without blotting, and light fastness, water resistance and moisture resistance are good.

As stated above, characteristics of ink used in an ink jet recording system in particular are greatly influenced by characteristics inherent in a dye. It is thus quite important to produce a dye and aqueous ink that satisfy these conditions.

DISCLOSURE OF THE INVENTION

The invention aims to provide aqueous ink which has a high image quality without blotting, which is excellent in storage stability, light fastness, moisture resistance and jet stability and which is useful as a recording liquid of an ink jet recording system.

The present inventors have assiduously conducted investigations to solve these problems, and have consequently come to complete the invention.

That is, the invention relates to:

(1) aqueous ink for ink jet recording comprising a coloring matter and an aqueous medium as main components, in which at least one of dyes represented by the formula (A) or their salts is contained as the coloring matter.

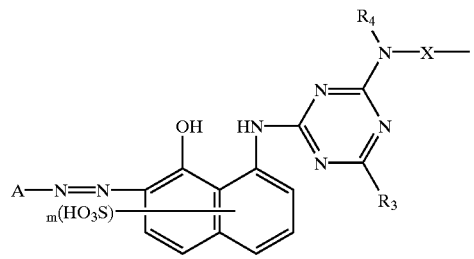

(A)

-continued

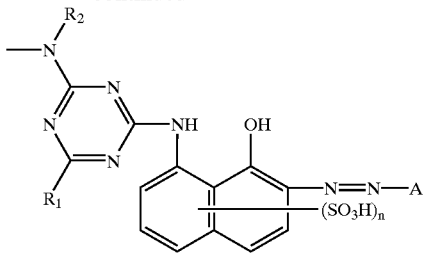

[wherein $R_1$ and $R_3$, independently from each other, represent a hydrogen atom, a hydroxyl group or a halogen atom, $R_2$ and $R_4$, independently from each other, represent a hydrogen atom, an optionally substituted alkyl group, an optionally substituted aryl group or an optionally substituted aralkyl group, A represents a phenyl group or a naphthyl group (the phenyl group or the naphthyl group may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group, a sulfonic acid amide group), X represents an alkylene group, a phenylene group, a xylylene group, a naphthylene group, a biphenylene group or a divalent bonding group represented by the formula (2)

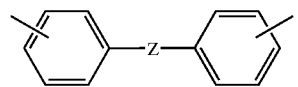

(2)

in which Z represents —CO—, —NHCONH—, —NHCSNH— or formula (3)

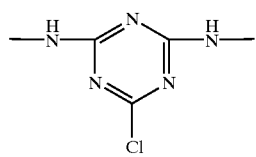

(3)

(these bonding groups may be substituted with a halogen atom, an alkyl group, an alkoxy group, a hydroxyl group, an amino group, a carboxyl group or a sulfonic acid group), and m and n, independently from each other, represent an integer of 1 to 4].

(2) the aqueous ink for ink jet recording as recited in (1), wherein in the formula (A), at least one of $R_1$ and $R_3$ is a halogen atom, (3) the aqueous ink for ink jet recording as recited in (1) or (2), wherein in the formula (A), X is an optionally substituted phenylene group, (4) the aqueous ink for ink jet recording as recited in any of (1) to (3), wherein in the formula (A), A is a naphthyl group (the naphthyl group may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group), (5) the aqueous ink for ink jet recording as recited in (1), wherein the dyes are dyes represented by the formula (B)

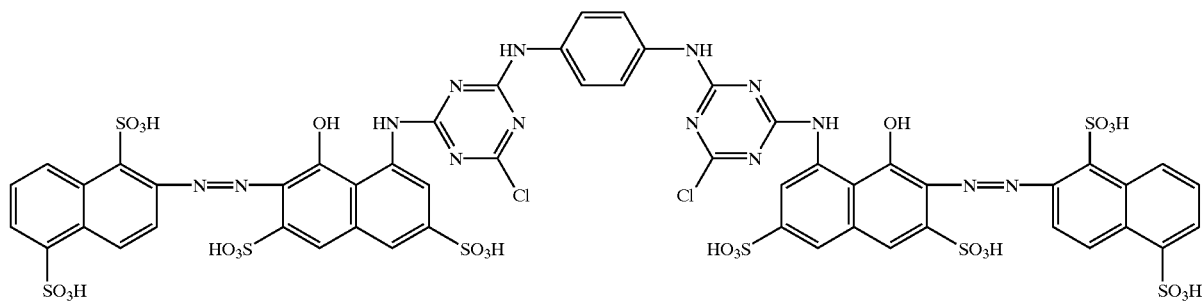

(B)

or their salts, (6) aqueous ink for ink jet recording, wherein a dye contains at least one of the dyes represented by the formula (B) as recited in (5), other dyes represented by the formula (C)

(7) a process for producing a dye, which comprises dissolving a dye represented by the formula (C) or its salt in water, and adjusting pH of the aqueous solution to 9 or more to remove insoluble matters formed.

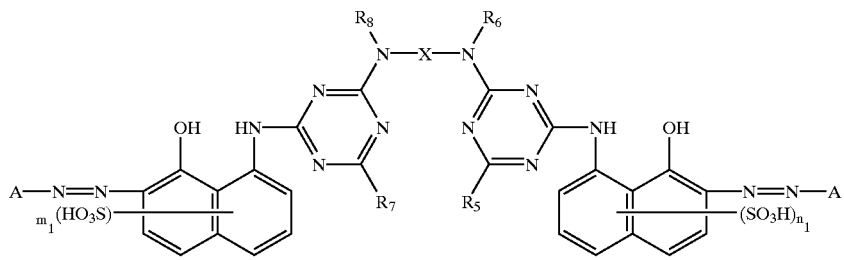

(C)

[wherein $R_5$ and $R_7$, independently from each other, represent a hydrogen atom, an optionally substituted alkyl group, an optionally substituted alkoxy group, an amino group, analkylamino group, a hydroxyl group or a halogen atom, $R_6$ and $R_8$, independently from each other, represent a hydrogen atom, an optionally substituted alkyl group, an optionally substituted aryl group or an aralkyl group, A represents a phenyl group or a naphthyl group (the phenyl group or the naphthyl group may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group), X represents a divalent bonding group, and $m_1$ and $n_1$, independently from each other, represent an integer of 1 to 4] or their salts,

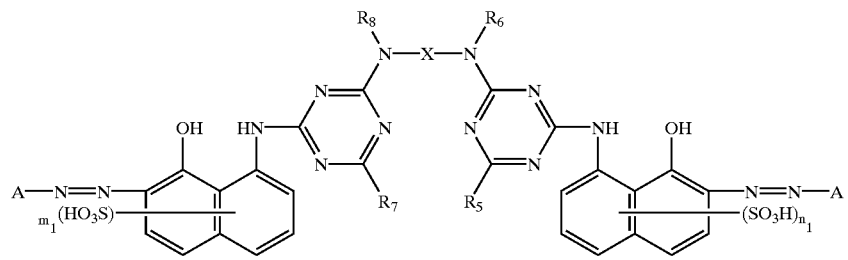

(C)

[wherein $R_5$ and $R_7$, independently from each other, represent a hydrogen atom, an optionally substituted alkyl group, an optionally substituted alkoxy group, an amino group, an alkylamino group, a hydroxyl group or a halogen atom, $R_6$ and $R_8$, independently from each other, represent a hydrogen atom, an optionally substituted alkyl group, an optionally substituted aryl group or an aralkyl group, A represents a phenyl group or a naphthyl group (the phenyl group or the naphthyl group may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group), X represents a divalent bonding group, and $m_1$ and $n_1$, independently from each other, represent an integer of 1 to 4], (8) a process for producing a dye, which comprises, after dissolving the dye represented by the formula (C) as recited in (7) or its salt in water to form the aqueous solution, mixing the aqueous solution with a water-soluble organic solvent to crystallize the dye, (9) a process for producing a dye, which comprises mixing the aqueous solution obtained by dissolving the dye represented by the formula (C) as recited in (7) or its salt in water and adjusting pH of the aqueous solution to 9 or more to remove insoluble matters formed with a water-soluble organic solvent to crystallize the dye,

(10) the process for producing the dye as recited in any of (7) to (9), wherein in the formula (C), X is an alkylene group, a phenylene group, a xylylene group, a naphthylene group, a biphenylene group or a divalent bonding group represented by the formula (5)

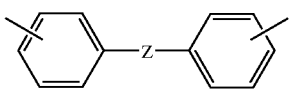

(5)

in which Z represents an oxygen atom, a sulfur atom, —CO—, —NHCONH—, —NHCSNH—, —CH=CH— or the formula (6)

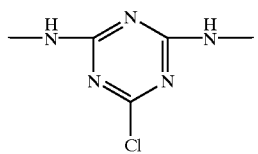

(6)

(these bonding groups may be substituted with a halogen atom, an alkyl group, an alkoxy group, a hydroxyl group, an amino group, a carboxyl group or a sulfonic acid group),

(11) the process for producing the dye as recited in any of (7) to (9), wherein in the formula (C), X is an optionally substituted phenylene group,

(12) the process for producing the dye as recited in any of (7) to (9), wherein in the formula (C), A is a naphthyl group (the naphthyl group may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group),

(13) the process for producing the dye as recited in any of (7) to (9), wherein the dye is the formula (B), and

(14) aqueous ink for ink jet recording characterized by containing at least one of the dyes produced by the process for producing the dye as recited in any of (7) to (13).

BEST MODE FOR CARRYING OUT THE INVENTION

The dyes contained in the aqueous ink for ink jet recording in the invention are represented by the foregoing formula (A).

They are preferably dyes represented by the formula (1)

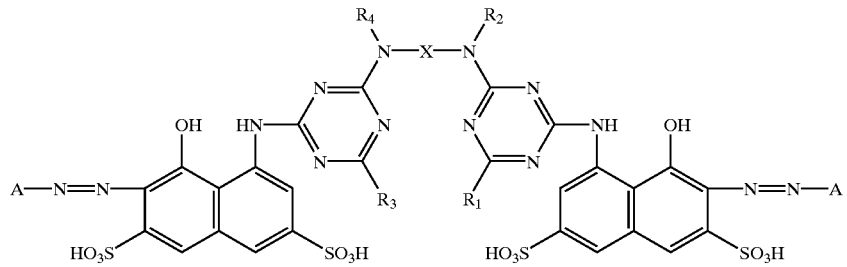

(1)

[wherein $R_1$ and $R_3$, independently from each other, represent a hydrogen atom, a hydroxyl group or a halogen atom, $R_2$ and $R_4$, independently from each other, represent a hydrogen atom, an optionally substituted alkyl group, an optionally substituted aryl group or an optionally substituted aralkyl group, A represents a phenyl group or a naphthyl group (the phenyl group or the naphthyl group may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group), X represents an alkylene group, a phenylene group, a xylylene group, a naphthylene group, a biphenylene group or a divalent bonding group represented by the formula (2)

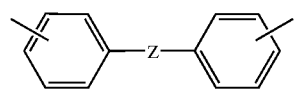

(2)

in which Z represents —CO—, —NHCONH—, —NHCSNH— or the formula (3)

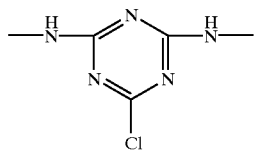

(3)

(these bonding groups may be substituted with a halogen atom, an alkyl group, an alkoxy group, a hydroxyl group, an amino group, a carboxyl group or a sulfonic acid group)] or their salts.

In these formulas (A) and (1), $R_1$ and $R_3$, independently from each other, represent a hydrogen atom, a hydroxyl group or a halogen atom, $R_2$ and $R_4$, independently from each other, represent a hydrogen atom, an optionally substituted alkyl group, an optionally substituted aryl group or an optionally substituted aralkyl group, A represents a phenyl group or a naphthyl group (which may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group), and X represents an optionally substituted alkylene group, an optionally substituted phenylene group, an optionally substituted xylylene group, an optionally substituted naphthylene group or a divalent bonding group represented by the formula (2) (these bonding groups maybe substituted with a halogen atom, an alkyl group, an alkoxy group, a hydroxyl group, an amino group, a carboxyl group or a sulfonic acid group).

In the divalent bonding group represented by the formula (2), Z represents —CO—, —NHCONH—, —NHCSNH— or the formula (3).

Further, in the formula (A), m and n, independently from each other, represent an integer of 1 to 4, and may be the same or different. Preferably, they are independently an integer of 2 or 3. Among others, a dye represented by the formula (1) in which m and n are both 2 or its salt is preferable.

In the dyes represented by the formula (C) which are contained in the aqueous ink of the invention, preferably dyes represented by the formula (4);

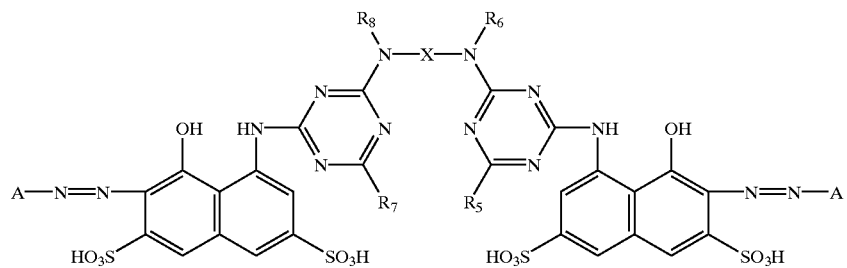

(4)

[wherein $R_5$ and $R_7$, independently from each other, represent a hydrogen atom, an optionally substituted alkyl group, an optionally substituted alkoxy group, an amino group, an alkylamino group, a hydroxyl group or a halogen atom, $R_6$ and $R_8$, independently from each other, represent a hydrogen atom, an optionally substituted alkyl group, an optionally substituted aryl group or an aralkyl group, A represents a phenyl group or a naphthyl group (the phenyl group or the naphthyl group may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group), and X represents a divalent bonding group] or their salts, $R_5$ and $R_7$, independently from each other, represent a hydrogen atom, an alkoxy group, an amino group, a hydroxyl group or a halogen atom, $R_6$ and $R_8$, independently from each other, represent a hydrogen atom, an optionally substituted alkyl group, an optionally substituted aryl group or an aralkyl group, A represents a phenyl group or a naphthyl group (which may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group), and X represents a divalent bonding group. Examples of X include an optionally substituted alkylene group, an optionally substituted phenylene group, an optionally substituted xylylene group, an optionally substituted naphthylene group, a divalent bonding group represented by the formula (5) (these bonding groups may be substituted with a halogen atom, an alkyl group, an alkoxy group, a hydroxyl group, an amino group, a carboxyl group or a sulfonic acid group) and the like. In the divalent bonding group represented by the formula (5), Z represents —NHCONH—, —NHCSNH— or a bonding group represented by the formula (6).

In the foregoing formula (A), formula (1), formula (C), formula (4) and divalent bonding group, examples of the halogen atom include a fluorine atom, a chlorine atom, a bromine atom and an iodine atom.

Further, the carboxyl group and the sulfonic acid group may be in the form of a free radical or a salt. Examples of the salt include a carboxylic acid salt group which is a salt with an alkali metal, an amine or the like and a sulfonic acid salt group which is a salt with an alkali metal, an amine or the like.

The salt is not particularly limited. Examples thereof include alkali metal salts of a lithium atom, a sodium atom, a potassium atom and the like, ammonium salts, and organic amine salts of a primary amine, a secondary amine, a tertiary amine and the like.

The optionally substituted alkyl group is not particularly limited. It is an alkyl group having the total carbon number of 20 or less, preferably 15 or less. Specific examples thereof include alkyl groups such as a methyl group, an ethyl group, an n-propyl group, an isopropyl group, an n-butyl group, an isobutyl group, a tert-butyl group and the like, and halogenated alkyl groups such as a trifluoromethyl group, a chloroethyl group and the like.

The optionally substituted alkoxy group is not particularly limited. It is an alkoxy group having the total carbon number of 20 or less, preferably 15 or less. Specific examples thereof include a methoxy group, an ethoxy group, an n-propoxy group, an isopropoxy group, an n-butoxy group, an isobutoxy group, a tert-butoxy group and the like.

The optionally substituted aralkyl group is not particularly limited. It is an aralkyl group having the total carbon number of 20 or less, preferably 15 or less. Specific examples thereof include a benzyl group, a phenetyl group and the like.

The optionally substituted alkyl group is not particularly limited. It is an aryl group having the total carbon number of 20 or less, preferably 15 or less. Specific examples thereof include an unsubstituted phenyl group, a halogen atom-substituted phenyl group such as a chlorophenyl group, a bromophenyl group, a fluorophenyl group or the like, a phenyl group substituted with at least one of alkyl groups such as a methyl group, an ethyl group, a propyl group, a butyl group and the like, a phenyl group substituted with a halogenoalkyl group such as a trifluoromethyl group or the like, and a phenyl group substituted with at least one of a hydroxyl group, an amino group, a carboxyl group, a sulfonic acid group and the like.

The carboxylic acid ester group is not particularly limited. It is a carboxylic acid ester group having the total carbon number of 20 or less, preferably 15 or less. Specific examples thereof include alkoxycarbonyl groups such as a methoxycarbonyl group, an ethoxycarbonyl group, a propoxycarbonyl group, a butoxycarbonyl group and the like.

The carboxylic acid amide group is not particularly limited. It is a carboxylic acid amide group having the total carbon number of 20 or less, preferably 15 or less. Specific examples thereof include alkylaminocarbonyl groups such as an aminocarbonyl group, a methylaminocarbonyl group, an ethylaminocarbonyl group, a propylaminocarbonyl group, a butylaminocarbonyl group, a dimethylaminocarbonyl group, a diethylaminicarbonyl group, a diethanolaminocarbonyl group and the like.

The sulfonic acid amide group is not particularly limited. It is a sulfonic acid amide group having the total carbon number of 20 or less, preferably 15 or less. Specific examples thereof include alkylaminosulfonyl groups such as an aminosulfonyl group, a methylaminosulfonyl group, an ethylaminosulfonyl group, a propylaminosulfonyl group, a butylaminosulfonyl group, a dimethylaminosulfonyl group, a diethylaminosulfonyl group, a diethanolaminosulfonyl group and the like.

The optionally substituted alkylene group is not particularly limited. It is an alkylene group having the total carbon number of 20 or less, preferably 15 or less. Specific examples thereof include —$C_pH_{2p}$— (p represents an integer of 1 to 10). These may be substituted with a halogen atom, an alkyl group, an alkoxy group, a hydroxyl group, an amino group, a carboxyl group, a sulfonic acid group and the like.

The optionally substituted phenylene group is not particularly limited. Examples thereof include an unsubstituted phenylene group, and phenylene groups substituted with an alkyl group or a halogen atom such as a methyl group, an ethyl group, a methoxy group, an ethoxy group, fluorine, chlorine, bromine, iodide or the like, a carboxyl group, a sulfonic acid group, a hydroxyl group, an amino group and the like.

The optionally substituted xylylene group is not particularly limited. Examples thereof include an unsubstituted xylylene group, and xylylene groups substituted with an alkyl group or a halogen group such as a methyl group, an ethyl group, a methoxy group, an ethoxy group, fluorine, chlorine, bromine, iodine or the like, a carboxyl group, a sulfonic acid group, a hydroxyl group, an amino group and the like.

The optionally substituted naphthylene group is not particularly limited. Examples thereof include an unsubstituted naphthylene group, and naphthylene groups substituted with an alkyl group or a halogen atom such as a methyl group, an ethyl group, a methoxy group, an ethoxy group, fluorine, chlorine, bromine, iodine or the like, a carboxyl group, a sulfonic acid group, a hydroxyl group, an amino group and the like. By the way, the bonding position of the divalent bonding group is not particularly limited. For example, in the optionally substituted phenylene group and xylylene group, it may be any of the o-position, the m-position and the p-position. In the optionally substituted naphthylene group, it may be any of the 1,5-position and the 2,6-position.

The dyes represented by the formula (A), formula (1), formula (C) and formula (4), which are used in the invention, are those in which at least one of $R_1$ and $R_3$ is a halogen atom and X is an alkylene group, a phenylene group, a xylylene group, a naphthylene group or a divalent bonding group represented by the formula (2) (these bonding groups may be substituted with a halogen atom, an alkyl group, an alkoxy group, a hydroxyl group, an amino group, a carboxyl group or a sulfonic acid group). Further preferable are those in which $R_1$ and $R_3$ are both halogen atoms, X is a phenylene group (which may be substituted with a halogen atom, an alkyl group, an alkoxy group, a hydroxyl group, an amino group, a carboxyl group or a sulfonic acid group) and A is a naphthyl group (the naphthyl group may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group). When $R_1$ and $R_3$ are halogen atoms, moisture resistance is improved. Incidentally, the halogen atom of $R_1$ and $R_3$ may be present in the form substituted with OH, H or the like.

The dyes represented by the formula (C) and the preferable dyes represented by the formula (4), which are used in the invention, are those in which at least one of $R_5$ and $R_7$ is a halogen atom and X is an optionally substituted alkylene group, an optionally substituted phenylene group, a xylylene group, an optionally substituted naphthylene group or a divalent bonding group represented by the formula (5) (these bonding groups may be substituted with a halogen atom, an alkyl group, an alkoxy group, a hydroxyl group, an amino group, a carboxyl group or a sulfonic acid group). More preferable are those in which $R_5$ and $R_7$ are both halogen atoms and X is an optionally substituted phenylene group (which may be substituted with a halogen atom, an alkyl group, an alkoxy group, a hydroxyl group, an amino group, a carboxyl group or a sulfonic acid group), preferably an unsubstituted phenylene group and A is an optionally substituted naphthyl group (the naphthyl group may be substituted with a halogen atom, a hydroxyl group, an amino group, an optionally substituted alkyl group, an alkoxy group, a carboxyl group, a carboxylic acid ester group, a carboxylic acid amide group, a sulfonic acid group or a sulfonic acid amide group), preferably a naphthyl group having a sulfone group. Especially preferable are dyes represented by the formula (B):

(B)

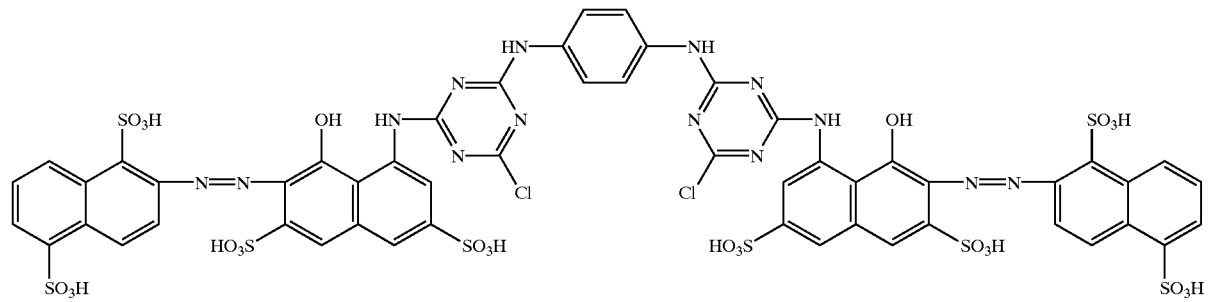

invention, may be in the form of a free acid or a salt. They may be used in any of these forms. Examples of the salt include alkali metal salts of sodium, potassium, lithium and the like, alkyl or hydroxylalkyl ammonium salts, and salts of organic amines such as ammonia, an alkylamine or a hydroxyalkylamine, a carboxy substituted amine and the like. These maybe used as a single salt or a mixed compound of plural salts. They may be partially in the form of a free acid as such. Moreover, they may properly be subjected to salt exchange as required.

The dyes represented by the formula (A) and the preferable dyes represented by the formula (1), which are used in By the way, when the dye is used in ink, two or more of the dyes represented by the formula (A) may be contained. When two or more dyes are contained, it is especially preferable that the dye of the formula (B) is contained as one thereof. The mixing of two or more dyes including the same makes it possible to create a delicate color tone and conduct high-quality ink jet printing.

Specific examples of the dyes are shown in Table 1. However, they are not critical at all.

TABLE 1
Structural Formula:
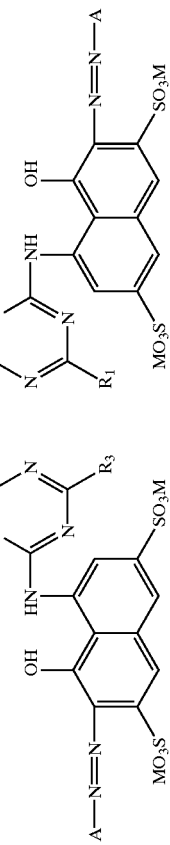
| Dye No. | R₁ | R₂ | R₃ | R₄ | A | M | X |
|---|---|---|---|---|---|---|---|
| 1 | Cl | H | Cl | H | 2-methylnaphthalene | Li | 2,4-dimethylphenyl-SO₃Li |
| 2 | Cl | H | Cl | H | naphthalene-1,5-disulfonate (SO₃Na), 2-methyl | Na | 2,4-dimethylphenyl-SO₃Na |
| 3 | Cl | H | OH | H | ↑ | Na | ↑ |
| 4 | Cl | H | OH | H | 1-SO₃Na, 2-methylnaphthalene | Na | ↑ |
| 5 | Cl | H | NH₂ | H | 1-SO₃Na, 3-SO₃Na, 6-methylnaphthalene | Na | ↑ |

TABLE 1-continued

| | | | | | |
|---|---|---|---|---|---|
| 6 | Cl | H | Cl | H | naphthyl-SO₃K | K | tolyl-SO₃K |
| 7 | Cl | H | Cl | H | naphthyl(SO₃NH₄)₂ with CH₃ | NH₄ | tolyl-SO₃NH₄ |
| 8 | Cl | H | Cl | H | naphthyl-SO₃NH(C₄H₉)₃ | NH(C₄H₉)₃ | tolyl-SO₃NH(C₄H₉)₃ |
| 9 | Cl | H | Cl | H | naphthyl(SO₃NH(C₂H₄OH)₃)₂ with CH₃ | NH(C₂H₄OH)₃ | tolyl-SO₃NH(C₂H₄OH)₃ |
| 10 | Cl | H | Cl | H | naphthyl(SO₃Na)₃ with CH₃ | Na | tolyl-SO₃Na |
| 11 | OH | H | OH | H | naphthyl-OCH₃ with CH₃ | Na | ↑ |

TABLE 1-continued

| # | | | | | | |
|---|---|---|---|---|---|---|
| 12 | OH | H | OH | ![2,6-disubstituted naphthalene with COOC₂H₅ and CH₃] | NH₄ | ![2,4-dimethylphenyl-SO₃NH₄] |
| 13 | Cl | H | Cl | ![naphthalene with C₂H₅OOC and CH₃] | Na | ![2,4-dimethylphenyl-SO₃Na] |
| 14 | Cl | CH₃ | Cl | ![naphthalene with Br and CH₃] | Na | ↑ |
| 15 | Cl | —CH₂—C₆H₅ | Cl | ![naphthalene with CH₃ and SO₃NH₄] | NH₄ | ![2,4-dimethylphenyl-SO₃NH₄] |
| 16 | Cl | C₆H₅ | Cl | ![naphthalene with CH₃ and SO₃NH₃CH₃] | NH₃CH₃ | ![2,4-dimethylphenyl-SO₃NH₃CH₃] |
| 17 | Cl | CH₃ | OH | ![naphthalene with CH₃ and SO₃Na] | Na | ![2,4-dimethylphenyl-SO₃Na] |
| 18 | Cl | CH₃ | Cl | ![naphthalene with CH₃ and SO₃Na] | Na | ↑ |

TABLE 1-continued

| | | | | | |
|---|---|---|---|---|---|
| 19 | Cl | H | Cl | H | ![naphthalene with SO₃Na, CH₃, OH substituents] | Na | ↑ |
| 20 | Cl | H | Cl | H | ![naphthalene with SO₃NH(CH₃)₃, SO₃NH(CH₃)₃, CH₃] | NH(CH₃)₃ | ![p-xylene ring] |
| 21 | OH | H | OH | H | ![naphthalene with SO₂NHC₃H₇, CH₃] | Na | ↑ |
| 22 | OH | H | OH | H | ![naphthalene with SO₂N(C₃H₇)₂, CH₃] | NH₄ | ↑ |
| 23 | Cl | H | Cl | H | ![naphthalene with SO₃Na, CH₃, NaO₃S] | Na | ↑ |

TABLE 1-continued

| | | | | | |
|---|---|---|---|---|---|
| 24 | Cl | H | Cl | H | 4-methyl-naphthalene-1,5-disulfonate (Na, Na) | K | —C$_2$H$_4$— |
| 25 | Cl | H | Cl | H | 4-methyl-naphthalene-1,5-disulfonate (NH$_4$, NH$_4$) | NH$_4$ | ↑ |
| 26 | Cl | H | Cl | H | 6-methyl-naphthalene-1,5-disulfonate (Na, Na) | Na | p-xylylene (–CH$_2$–C$_6$H$_4$–CH$_2$–) |
| 27 | Cl | H | Cl | H | 7-methyl-4-hydroxy-naphthalene-2-sulfonate (Na) | Na | ↑ |
| 28 | Cl | H | Cl | H | 7-methyl-naphthalene-1,5-disulfonate (Na, Na) | Na | 1,5-naphthalenediyl |

TABLE 1-continued
| | | | | | |
|---|---|---|---|---|---|
| 29 | Cl | H | H | Cl | 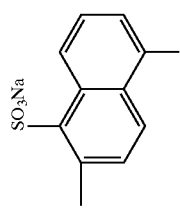 | Na | 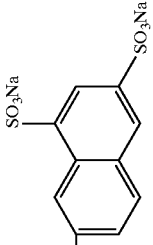 |
| 30 | Cl | H | H | Cl | 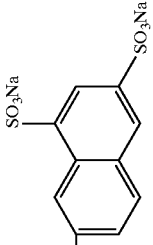 | Na | 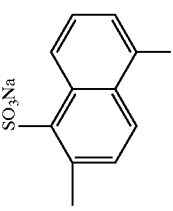 |
| 31 | Cl | H | H | Cl | 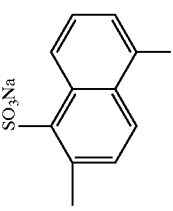 | Na |  |
| 32 | Cl | H | H | Cl | 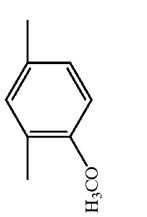 | Na | 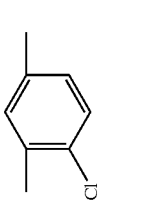 |
| 33 | Cl | H | H | Cl | ↑ | Na | 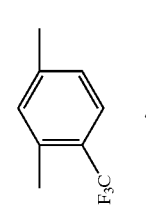 |
| 34 | Cl | H | H | Cl | ↑ | Na | 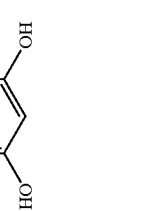 |

TABLE 1-continued

| | | | | | |
|---|---|---|---|---|---|
| 35 | Cl | H | OH | H | naphthalene with SO₃Na, SO₃Na, and methyl substituents | Na | p-tolyl |
| 36 | Cl | H | Cl | H | ↑ | Na | ↑ |
| 37 | Cl | H | Cl | H | naphthalene with SO₃NH₄, SO₃NH₄, and methyl substituents | NH₄ | ↑ |
| 38 | Cl | H | Cl | H | naphthalene with SO₃Na, SO₃Na, and methyl substituents | Na | 4-chloro-2,6-bis(p-tolylamino)-1,3,5-triazine |
| 39 | Cl | H | Cl | H | naphthalene with SO₃NH(CH₃)₃, SO₃NH(CH₃)₃, and methyl substituents | NH(CH₃)₃ | ↑ |

TABLE 1-continued

| | | | | | | |
|---|---|---|---|---|---|---|
| 40 | Cl | H | H | Cl | ![naphthalene with SO₃NH₄, SO₃NH₄, CH₃] | NH₄ | ← |
| 41 | Cl | CH₃ | CH₃ | Cl | ← | NH₄ | ← |
| 42 | OH | H | H | OH | ← | NH₄ | ← |
| 43 | Cl | C₃H₇ | C₃H₇ | Cl | ![naphthalene with SO₃NH₄ groups and CH₃] | NH₄ | ← |
| 44 | Cl | H | H | Cl | ← | NH₄ | ![thiourea with two p-tolyl groups, N-C(=S)-N] |
| 45 | Cl | H | H | Cl | ![naphthalene with SO₃Na, SO₃Na, CH₃] | Na | ← |
| 46 | Cl | H | H | Cl | ← | Na | ![p-xylene / 1,4-dimethylbenzene] |

TABLE 1-continued

| # | | | | | |
|---|---|---|---|---|---|
| 47 | Cl | H | H | Cl | naphthalene with SO₃K, SO₃K, CH₃ | K |
| 48 | Cl | CH₃ | CH₃ | Cl | benzene-SO₃NH₄, SO₃NH₄, CH₃ | NH₄ |
| 49 | OH | H | H | OH | ← | NH₄ |
| 50 | Cl | C₃H₇ | C₃H₇ | Cl | benzene-SO₃NH₄, CH₃, H₄NO₃S | NH₄ |
| 51 | Cl | H | H | Cl | ← (p-xylene ring) | NH₄ |
| 52 | Cl | H | H | Cl | ← | Na |
| 53 | Cl | H | H | Cl | benzene-SO₃Na, SO₃Na, CH₃ / benzene with SO₃Na, CH₃, NaO₃S | Na |
| 54 | Cl | H | H | Cl | benzene-SO₃K, SO₃K, CH₃ | K |

TABLE 1-continued

Structural Formula

| Dye No. | Structural Formula |
|---|---|
| 55 | (structure) |
| 56 | (structure) |
| 57 | (structure) |

TABLE 1-continued

A method for forming the dyes contained in the aqueous ink of the invention is not particularly limited. For example, the dyes can be formed according to a method described in Hosoda Yutaka, "RIRON SEIZO SENRYO KAGAKU 5th ed." (Jul. 15, 1968, published by K. K. Gihodo).

For example, regarding dye No. 2 in Table 1, a solution (pH 6 to 6.5) of a sodium salt of H-acid in water is added dropwise to cyanuric chloride dispersed in water at 0 to 2° C. over 1 hour. The product is precipitated with sodium chloride.

The precipitated product and sodium acetate are added to water, and a solution of a diazo compound of 2-aminonaphthalene-1,5-disulfonic acid is added to conduct azo coupling (the coupling reaction can be conducted according to a method described in, for example, Hosoda Yutaka, "RIRON SEIZO SENRYO KAGAKU 5th ed."). After the reaction, the product is neutralized with a dilute solution of sodium carbonate to form a sodium salt. Sodium chloride is added to precipitate a monoazo dye. After separation by filtration, the monoazo dye is dissolved in water. To this solution is added a neutral aqueous solution of 0.5 equivalent of sodium 1,3-diaminobenzene-6-sulfonate at 40 to 45° C. to conduct a reaction. The solution is precipitated with the addition of sodium chloride. Thus, dye No. 2 in Table 1 can be produced in the form of a sodium salt.

The aqueous ink of the invention is useful as various inks, especially a recording liquid of an ink jet recording system. The dye can be used as such. Especially when it is used in a recording liquid of an ink jet recording system, it is advisable to remove or reduce impurities such as a starting material used for production of the dye, intermediates or byproducts formed during production, inorganic salts such as KCl, NaCl and $Na_2SO_4$, and the like for preventing clogging of a jet nozzle portion of a recording device by these impurities.

Removal or reduction of the impurities may be conducted, for example, with an ion exchange resin, by ultrafiltration or the like. However, these methods are problematic in that they take quite a long time, labor, costs and the like. According to the process for producing the dye in the invention, the dye formed is dissolved in water to give an aqueous solution which is then adjusted to pH of 9 or more, preferably 10 or more, whereby impurities contained in the dye, such as a starting material used for production of the dye, intermediates or byproducts formed during production and the like can be insolubilized and removed by filtration. At this time, it is preferable to use a filter aid in combination for increasing removal efficiency. Further, inorganic salts can be removed in a filtrate by mixing the aqueous solution of the dye with a water-soluble organic solvent to crystallize the dye and filtering the same. At this time, after the dye is dissolved in water, a water-soluble organic solvent may be added. Alternatively, the aqueous solution of the dye is charged into a water-soluble organic solvent for crystallization. Either the step of removing the starting material used for production of the dye, the intermediates or the byproducts formed during production and the like or the step of removing the inorganic salts may be conducted earlier. Preferably, the step of removing the inorganic salts is conducted later. In the thus-obtained dye, it is preferable that the impurities are not precipitated at pH in using ink. The contents of the inorganic salts are preferably 5% or less, more preferably 1% or less, especially preferably 0.5% or less. Consequently, clogging in a jet nozzle portion of ink produced using the dye can be suppressed.

Water used in production of the dye and production of the ink is not particularly limited. It is advisable that water less contains inorganic salts, inorganic ions and impurity components. Filtered water, deionized water, distilled water and the like are preferable.

The amount of water used in dissolving the dye in water varies with solubility of the dye and contents of inorganic materials and organic materials. It is usually 1 to 100 parts by weight per part by weight of the dye. The dissolution is conducted usually at room temperature. However, when the concentration of the dye is high or the solubility is low, it can be dissolved by heating. With respect to the heating temperature in this case, it is preferable that the heating is conducted at such a temperature that the dye is not decomposed. In the adjustment of pH, for example, acetic acid, hydrochloric acid, sulfuric acid, nitric acid or the like can be used as an acid, and, for example, sodium hydroxide, potassium hydroxide, aqueous ammonia, tetramethylammonium hydroxide, tetrabutylammonium hydroxide or the like as a base. However, other materials are not problematic in particular.

The filter aid used is not particularly limited. Examples thereof include siliceous earth, sawdust, asbestos, paper pulp, activated carbon, Celite, talc and the like.

The amount of the water-soluble organic solvent used to remove inorganic salts varies with the concentration of the dye aqueous solution, the solubility of the dye and the contents of the impurities in the dye, and also varies with the contents of the impurities in the desired dye after production. It is usually 1 to 100 parts by weight per part by weight of the dye. The water-soluble organic solvent having the low solubility of the dye is preferable. Examples thereof include polyhydric alcohols such as ethylene glycol, diethylene glycol, triethylene glycol, polyethylene glycol, propylene glycol, polypropylene glycol, 1,3-propanediol, glycerin, thioglycol and the like, polyhydric alcohol ethers such as ethylene glycol monoethyl ether, ethylene glycol monobutyl ether, diethylene glycol monobutyl ether, dipropylene glycol monoethyl ether, triethylene glycol monomethyl ether and the like, ketones such as acetone, methyl ethyl ketone and the like, amides such as N,N-dimethylformamide, N,N-diethylformamide, N,N-dimethylacetamide and the like, nitrogen-containing compounds such as 2-pyrrolidone, N-methyl-2-pyrrolidone, N-vinyl-2-pyrrolidone, 1,3-dimethyl-2-imidazolidinone and the like, ethers such as tetrahydrofuran, dioxane and the like, alcohols such as methanol, ethanol, 1-propanol, 2-propanol, 1-butanol, 2-butanol and the like, and so forth. Preferable are alcohols, polyhydric alcohols and ketones. These water-soluble organic solvents may be used singly or in combination.

Further, with respect to dyes having low crystallinity in crystallizing the same for removal of inorganic salts, additives can also be added in view of acceleration of crystallization unless properties of dyes after purification are decreased.

Main components of the aqueous ink in the invention are the dye and water. For preventing drying of the ink, improving solubility of the dye or the like, an organic solvent is incorporated as required. The dyes represented by the formula (A), formula (1), formula (C) and formula (4) may be used singly or in combination respectively. The use amounts thereof depend on the use, the purpose, the type of the dye, the ink formulation, the printing density of the ink and the amounts of the impurities. Based on the total aqueous ink, the dye is preferably 0.5 to 20% by weight, especially preferably 1 to 10% by weight, and the organic solvent is preferably 0 to 80% by weight.

Moreover, for adjusting the color tone of the ink and improving the other properties, it is also possible to add known dyes or pigments formed in emulsion or fine dispersion unless the properties of the ink are impaired.

Examples of the water-soluble organic solvent incorporated in the aqueous ink of the invention include polyhydric alcohols such as ethylene glycol, diethylene glycol, triethylene glycol, polyethylene glycol, propylene glycol, polypropylene glycol, 1,3-propanediol, glycerin, thioglycol and the like, polyhydric alcohol ethers such as ethylene glycol monoethyl ether, ethylene glycol monobutyl ether, diethylene glycol monobutyl ether, dipropylene glycol monoethyl ether, triethylene glycol monomethyl ether and the like, ketones such as acetone, methyl ethyl ketone and the like, amides such as N,N-dimethylformamide, N,N-diethylformamide, N,N-dimethylacetamide and the like, nitrogen-containing compounds such as 2-pyrrolidone, N-methyl-2-pyrrolidone, N-vinyl-2-pyrrolidone, 1,3-dimethyl-2-imidazolidinone and the like, ethers such as tetrahydrofuran, dioxane and the like, alcohols such as methanol, ethanol, 1-propanol, 2-propanol, 1-butanol, 2-butanol and the like, and so forth. These water-soluble organic solvents may be used singly or in combination, and the content thereof is 0 to 80% by weight, preferably 5 to 50% by weight.

Further, for improving properties (for example, water resistance) of the ink, pH of the ink is preferably 8 or more.

Still further, for more improving water resistance, it is advisable to use amines such as ammonia and the like and hydroxyamines such as triethanolamine and the like in combination. The contents are preferably 0.001 to 10% by weight based on the ink. Besides, these amines may be used by forming counter ions with the dye.

Furthermore, urea, thiourea, biuret, semicarbamide or derivatives thereof may be used in combination with the ink containing the dye in the invention. The content thereof is preferably 0.1 to 15% by weight based on the aqueous ink.

Moreover, various additives used so far can be added, as required, to the aqueous ink of the invention. Examples thereof include an ultraviolet absorber, an antioxidant, a chelating agent, a water-soluble polymer, a masking agent, a rust-proofing agent, a preservative, a viscosity modifier, a surfactant, a surface tension modifier, a pH adjustor, a specific resistance modifier, a near infrared absorber, a penetrant and the like.

The aqueous ink of the invention is produced by dissolving the dye along with water, the organic solvent and, as required, the foregoing additives. The thus-produced aqueous ink is excellent in recording characteristics, storage stability, fixability onto a recording medium, sharpness of a recorded image, light fastness, moisture resistance and the like as ink of writing instruments and the like or as ink of an ink jet recording system. It is especially useful as a recording liquid of an ink jet recording system, and further used also as ink of writing instruments such as a ball point pen, a felt tipped pen, a fountain pen and the like.

EXAMPLES

The invention is illustrated more specifically below by referring to Examples. However, the invention is not limited to the following Examples. Incidentally, "part(s)" indicates part(s) by weight.

Example 1

<Production of a Dye>

Five parts of dye No. 46 in Table 1 was dissolved in 20 parts of distilled water. This dye aqueous solution was charged into 10 parts of isopropyl alcohol to crystallize the dye. The mixture was filtered, and dried to obtain 3 parts of a purified product of dye No. 46 in Table 1. Analytical values of the dye are shown in Table 2. As a result, the content of an inorganic salt such as NaCl or the like was decreased, and the usable dye was formed by a simple process of production and purification.

TABLE 2

|  | Content (%) of NaCl |
| --- | --- |
| Dye No. 46 in Table 1 before purification | 15.5 |
| Dye No. 46 in Table 1 after purification | 0.8 |

<Production of Ink>

According to a formulation shown below, the compounds were mixed and dissolved, and the mixture was filtered with a Teflon filter having a pore diameter of 0.45 micron to produce ink.

| <Formulation of ink> | |
| --- | --- |
| dye No. 46 in Table 1 after purification | 3 parts |
| diethylene glycol | 30 parts |
| N-methyl-2-pyrrolidone | 10 parts |
| deionized water | 57 parts |

<Evaluation of Properties>

The above-produced ink was used, and filled in an ink cartridge for a piezo-type ink jet printer, and printing and image recording were conducted with the same printer. The test was conducted on the following items. The results were good, namely, (A) evaluation of an image; ⊚, (B) evaluation of moisture resistance; ⊚, (C) evaluation of light fastness; ⊚,(D) evaluation of storage stability of ink; ○ and (E) evaluation of a state of a printer nozzle; ○.

Meanwhile, ink was likewise produced using a dye containing large amounts of inorganic salts before production, and likewise evaluated. The results were (A) evaluation of an image; ○, (B) evaluation of moisture resistance; ⊚, (C) evaluation of light fastness; ⊚, (D) evaluation of storage stability of ink; Δ and (E) evaluation of a state of a printer nozzle; X.

Incidentally, the ink containing the dye in which inorganic salts were reduced by the simple process of the present application was, when used in an ink jet recording liquid in particular, excellent in storage stability of ink and jet stability from a printer nozzle.

Evaluation standards of the respective test items are as follows.

(A) Evaluation of an Image

An image was formed on a plain paper, and a blotting condition was visually evaluated.

| [Evaluation standard] | |
| --- | --- |
| Blotting is not observed; | ⊚ |
| Blotting is slightly observed without any influence on an image; | ○ |
| Blotting is notably observed; | X |

(B) Evaluation of Moisture Resistance

An image-recorded plain paper was allowed to stand under conditions of 40° C. and humidity of 85% for a fixed period of time, and a condition of the recorded image was visually observed to evaluate moisture resistance.

| [Evaluation standard] | |
|---|---|
| An image is unchanged after the paper is allowed to stand for 48 hours; | ⊚, |
| An image is unchanged after the paper is allowed to stand for 24 hours, and a coloring matter is bled in an edge portion of the recorded image after the paper is allowed to stand for 48 hours; | ○ |
| A coloring matter is bled in an edge portion of a recorded image after the paper is allowed to stand for 24 hours; | X. |

(C) Evaluation of Light Fastness

Printing density (OD value) was measured before irradiation and after 100 hours of irradiation using a xenon fade meter (manufactured by Suga Test Instrument Co Ltd) and a reflection densitometer (manufactured by Macbeth). Light fastness was evaluated upon comparing OD.

$OD = (OD$ value after irradiation$)/(OD$ value before irradiation$) \times 100$ (%)

| [Evaluation standard] | |
|---|---|
| OD is 100% to 80%; | ⊚ |
| OD is less than 80% to 70%; | ○ |
| OD is less than 70% to 50%; | Δ |
| OD is less than 50%; | X |

(D) Evaluation of Storage Stability of Ink

A condition of ink after storage at 40° C. was visually observed.

[Evaluation Standard]

An insoluble matter is absent after 3 months; ⊚

An insoluble matter is absent after 1 month, but appeared after 3 months, which is not problematic in use, though; ○

An insoluble matter appeared after 1 month, which is not problematic in use, though, and an insoluble matter appeared after 3 months, which is problematic in use; Δ

An insoluble matter appeared after 1 month, which is problematic in use; X.

(E) Evaluation of a Condition of a Printer Nozzle

After printing with a piezo-type ink jet printer, a condition of a nozzle was visually observed.

| [Evaluation standard] | |
|---|---|
| Normal; | ○ |
| An adherent matter is slightly observed, which is not problematic in use, though; | Δ |
| An adherent matter is observed, which is problematic in use; | X. |

Example 2

<Production of a Dye>

Five parts of dye No. 30 in Table 1 was dissolved in 20 parts of distilled water. To this dye aqueous solution was added dropwise 10 parts of acetone to crystallize the dye. The mixture was filtered, and dried to obtain 3 parts of a purified product of dye No. 30 in Table 1. Analytical values of the dye are shown in Table 3. As a result, the content of an inorganic salt such as NaCl or the like was decreased, and the usable dye was formed by the simple process of production and purification.

TABLE 3

| | Content (%) of NaCl |
|---|---|
| Dye No. 30 in Table 1 before purification | 10.4 |
| Dye No. 30 in Table 1 after purification | 0.5 |

<Production of Ink>

According to a formulation shown below, the compounds were mixed and dissolved, and the mixture was filtered with a membrane filter having a pore diameter of 0.45 micron to produce ink.

| <Formulation of ink> | |
|---|---|
| dye No. 30 in Table 1 after purification | 3 parts |
| triethylamine | 1 part |
| diethylene glycol | 30 parts |
| N-methyl-2-pyrrolidone | 10 parts |
| deionized water | 56 parts |

<Evaluation of Properties>

Properties were evaluated by the methods described in Example 1 using the foregoing ink.

The results were good, namely, (A) evaluation of an image; ⊚. (B) evaluation of moisture resistance; ⊚, (C) evaluation of light fastness; ⊚, (D) evaluation of storage stability of ink; ○ and (E) evaluation of a state of a printer nozzle; ○.

Meanwhile, ink was likewise produced using a dye containing large amounts of inorganic salts before production, and likewise evaluated. The results were (A) evaluation of an image; ○, (B) evaluation of moisture resistance; ⊚, (C) evaluation of light fastness; ⊚, (D) evaluation of storage stability of ink; Δ and (E) evaluation of a state of a printer nozzle; X.

Incidentally, the ink containing the dye in which inorganic salts were reduced by the simple process of the application was, when used in an ink jet recording liquid in particular, excellent in storage stability of ink and jet stability from a printer nozzle.

Examples 3 to 37

Production of dyes and production of inks were conducted by the processes described in Example 1 using dyes shown in Table 1. The results are shown in Table 4.

TABLE 4

| EXAMPLE | | CHARACTERISTICS | | | | |
|---|---|---|---|---|---|---|
| NO. | DYE NO. | A | B | C | D | E |
| 3 | 1 | ⊚ | ⊚ | ⊚ | ○ | ○ |
| 4 | 2 | ⊚ | ⊚ | ⊚ | ○ | ○ |
| 5 | 3 | ⊚ | ○ | ⊚ | ○ | ○ |

TABLE 4-continued

| EXAMPLE NO. | DYE NO. | A | B | C | D | E |
|---|---|---|---|---|---|---|
| 6 | 4 | ◎ | ◎ | ◎ | ○ | ○ |
| 7 | 5 | ◎ | ○ | ◎ | ◎ | ○ |
| 8 | 6 | ◎ | ◎ | ◎ | ○ | ○ |
| 9 | 7 | ◎ | ◎ | ◎ | ○ | ○ |
| 10 | 8 | ◎ | ◎ | ◎ | ○ | ○ |
| 11 | 9 | ◎ | ◎ | ◎ | ○ | ○ |
| 12 | 10 | ◎ | ◎ | ◎ | ○ | ○ |
| 13 | 11 | ◎ | ○ | ◎ | ○ | ○ |
| 14 | 12 | ◎ | ○ | ◎ | ○ | ○ |
| 15 | 14 | ◎ | ◎ | ◎ | ◎ | ○ |
| 16 | 16 | ◎ | ◎ | ◎ | ○ | ○ |
| 17 | 20 | ◎ | ◎ | ◎ | ○ | ○ |
| 18 | 21 | ◎ | ○ | ◎ | ○ | ○ |
| 19 | 22 | ◎ | ○ | ◎ | ○ | ○ |
| 20 | 25 | ◎ | ◎ | ◎ | ○ | ○ |
| 21 | 26 | ◎ | ◎ | ◎ | ○ | ○ |
| 22 | 28 | ◎ | ◎ | ◎ | ○ | ○ |
| 23 | 29 | ◎ | ◎ | ◎ | ◎ | ○ |
| 24 | 31 | ◎ | ◎ | ◎ | ○ | ○ |
| 25 | 32 | ◎ | ◎ | ◎ | ○ | ○ |
| 26 | 33 | ◎ | ◎ | ◎ | ○ | ○ |
| 27 | 34 | ◎ | ◎ | ◎ | ○ | ○ |
| 28 | 35 | ◎ | ○ | ◎ | ○ | ○ |
| 29 | 36 | ◎ | ◎ | ◎ | ○ | ○ |
| 30 | 37 | ◎ | ◎ | ◎ | ○ | ○ |
| 31 | 38 | ◎ | ◎ | ◎ | ○ | ○ |
| 32 | 39 | ◎ | ◎ | ◎ | ○ | ○ |
| 33 | 40 | ◎ | ◎ | ◎ | ○ | ○ |
| 34 | 42 | ◎ | ○ | ◎ | ○ | ○ |
| 35 | 43 | ◎ | ◎ | ◎ | ◎ | ○ |
| 36 | 44 | ◎ | ◎ | ◎ | ○ | ○ |
| 37 | 45 | ◎ | ◎ | ◎ | ○ | ○ |

Example 38

<Production of a Dye>

Five parts of dye No. 46 in Table 1 was dissolved in 20 parts of distilled water. While this dye aqueous solution was stirred, a 10%-sodium hydroxide aqueous solution was added until pH reached 10. After the solution was stirred for 1 hour, 2 parts of activated carbon was added, and stirring was further conducted for 1 hour. Subsequently, the mixture was filtered with filter paper No. 5C, and a filtrate was charged into 10 parts of isopropyl alcohol to crystallize the dye. The mixture was filtered, and dried to obtain 3 parts of a purified product of dye No. 46 in Table 1. Analytical values of the dye are shown in Table 5. As a result, the content of an inorganic salt such as NaCl or the like was decreased, and impurities such as a starting material used for production of the dye, intermediates or byproducts formed during production and the like were also removed. Thus, the usable dye was formed by the simple process of production and purification.

TABLE 5

| | Content (%) of NaCl |
|---|---|
| Dye No. 46 in Table 1 before purification | 15.5 |
| Dye No. 46 in Table 1 after purification | 0.7 |

<Production of Ink>

According to a formulation shown below, the compounds were mixed and dissolved, and the mixture was filtered with a Teflon filter having a pore diameter of 0.45 micron to produce ink.

| <Formulation of ink> | |
|---|---|
| dye No. 46 in Table 1 after purification | 3 parts |
| diethylene glycol | 30 parts |
| N-methyl-2-pyrrolidone | 10 parts |
| deionized water | 57 parts |

<Evaluation of Properties>

Properties were evaluated by the methods described in Example 1 using the foregoing ink. The results were good, namely, (A) evaluation of an image; ◎, (B) evaluation of moisture resistance; ◎, (C) evaluation of light fastness; ◎, (D) evaluation of storage stability of ink; ◎ and (E) evaluation of a state of a printer nozzle; ○.

Meanwhile, ink was likewise produced using a dye containing large amounts of a starting material, intermediates, byproducts and inorganic salts before production, and likewise evaluated. The results were (A) evaluation of an image; ○, (B) evaluation of moisture resistance; ◎, (C) evaluation of light fastness; ◎, (D) evaluation of storage stability of ink; Δ and (E) evaluation of a state of a printer nozzle; X.

Incidentally, the ink containing the dye produced by the simple process of the application was, when used in an ink jet recording liquid in particular, excellent in storage stability of ink and jet stability from a printer nozzle.

Example 39

<Production of a Dye>

Five parts of dye No. 46 in Table 1 was dissolved in 20 parts of distilled water. While this dye aqueous solution was stirred, a 10%-sodium hydroxide aqueous solution was added until pH reached 10. After the solution was stirred for 1 hour, 2 parts of Celite was added, and stirring was further conducted for 1 hour. Subsequently, the mixture was filtered with filter paper No. 5C, and a filtrate was charged into 10 parts of isopropyl alcohol to crystallize the dye. The mixture was filtered, and dried to obtain 3 parts of a purified product of dye No. 46 in Table 1. Analytical values of the dye are shown in Table 6. As a result, the content of an inorganic salt such as NaCl or the like was decreased, and impurities such as a starting material used in production of the dye, intermediates or byproducts formed during production and the like were removed. Thus, the usable dye was formed by the simple process of production and purification.

TABLE 6

| | Content (%) of NaCl |
|---|---|
| Dye No. 46 in Table 1 before purification | 15.5 |
| Dye No. 46 in Table 1 after purification | 0.6 |

<Production of Ink>

According to a formulation shown below, the compounds were mixed and dissolved, and the mixture was filtered with a Teflon filter having a pore diameter of 0.45 micron to produce ink.

| <Formulation of ink> | |
|---|---|
| dye No. 46 in Table 1 after purification | 3 parts |
| diethylene glycol | 30 parts |
| N-methyl-2-pyrrolidone | 10 parts |
| deionized water | 57 parts |

<Evaluation of Properties>

Properties were evaluated by the methods described in Example 1 using the foregoing ink. The results were good, namely, (A) evaluation of an image; ⊚, (B) evaluation of moisture resistance; ⊚, (C) evaluation of light fastness; ⊚, (D) evaluation of storage stability of ink; ⊚ and (E) evaluation of a state of a printer nozzle; ○.

Meanwhile, ink was likewise produced using a dye containing large amounts of a starting material, intermediates, byproducts and inorganic salts before production, and likewise evaluated. The results were (A) evaluation of an image; ○, (B) evaluation of moisture resistance; ⊚, (C) evaluation of light fastness; ⊚, (D) evaluation of storage stability of ink; Δ and (E) evaluation of a state of a printer nozzle; X.

Incidentally, the ink containing the dye produced by the simple process of the application was, when used in an ink jet recording liquid in particular, excellent in storage stability of ink and jet stability from a printer nozzle.

Example 40

<Production of a Dye>

Five parts of dye No. 30 in Table 1 was dissolved in 20 parts of distilled water. While this dye aqueous solution was stirred, a 10%-sodium hydroxide aqueous solution was added until pH reached 10. After the solution was stirred for 1 hour, 2 parts of diatomaceous earth was added, and stirring was further conducted for 1 hour. Subsequently, the mixture was filtered with filter paper No. 5C, and 10 parts of acetone was added dropwise to a filtrate to crystallize the dye. The mixture was filtered, and dried to obtain 3 parts of a purified product of dye No. 30 in Table 1. Analytical values of the dye are shown in Table 7. As a result, the content of an inorganic salt such as NaCl or the like was decreased, and impurities such as a starting material used for production of the dye, intermediates or byproducts formed during production and the like were removed. Thus, the usable dye was formed by the simple process of production and purification.

TABLE 7

| | Content (%) of NaCl |
|---|---|
| Dye No. 30 in Table 1 before purification | 10.4 |
| Dye No. 30 in Table 1 after purification | 0.5 |

<Production of Ink>

According to a formulation shown below, the compounds were mixed and dissolved, and the mixture was filtered with a membrane filter having a pore diameter of 0.45 micron to produce ink.

| <Formulation of ink> | |
|---|---|
| dye No. 30 in Table 1 after purification | 3 parts |
| triethylamine | 1 part |
| diethylene glycol | 30 parts |
| N-methyl-2-pyrrolidone | 10 parts |
| deionized water | 56 parts |

<Evaluation of Properties>

Properties were evaluated by the methods described in Example 1 using the foregoing ink. The results were good, namely, (A) evaluation of an image; ⊚, (B) evaluation of moisture resistance; ⊚, (C) evaluation of light fastness; ⊚, (D) evaluation of storage stability of ink; ⊚ and (E) evaluation of a state of a printer nozzle; ○.

Meanwhile, ink was likewise produced using a dye containing large amounts of a starting material, intermediates, byproducts and inorganic salts before production, and likewise evaluated. The results were (A) evaluation of an image; ○, (B) evaluation of moisture resistance; ⊚, (C) evaluation of light fastness; ⊚, (D) evaluation of storage stability of ink; Δ and (E) evaluation of a state of a printer nozzle; X.

Incidentally, the ink containing the dye produced by the simple process of the application was, when used in an ink jet recording liquid in particular, excellent in storage stability of ink and jet stability from a printer nozzle.

Example 41

<Production of a Dye>

Five parts of dye No. 30 in Table 1 was dissolved in 20 parts of distilled water. While this dye aqueous solution was stirred, a 10%-sodium hydroxide aqueous solution was added until pH reached 10. After the solution was stirred for 1 hour, 2 parts of diatomaceous earth was added, and stirring was further conducted for 1 hour. Subsequently, the mixture was filtered with filter paper No. 5C to obtain a dye aqueous solution having a concentration of approximately 20%. As a result, impurities such as a starting material used for production of the dye, intermediates or by products formed during production and the like were removed, and the usable dye was formed by the simple process of production and purification.

<Production of Ink>

According to a formulation shown below, the compounds were mixed and dissolved, and the mixture was filtered with a membrane filter having a pore diameter of 0.45 micron to produce ink.

| <Formulation of ink> | |
|---|---|
| 20% aqueous solution of dye No. 30 in Table 1 after purification | 15 parts |
| triethylamine | 1 part |
| diethylene glycol | 30 parts |
| N-methyl-2-pyrrolidone | 10 parts |
| deionized water | 44 parts |

<Evaluation of Properties>

Properties were evaluated by the methods described in Example 1 using the foregoing ink. The results were good, namely, (A) evaluation of an image; ⊚, (B) evaluation of moisture resistance; ⊚, (C) evaluation of light fastness; ⊚, (D) evaluation of storage stability of ink; ○ and (E) evaluation of a state of a printer nozzle; ○.

Meanwhile, ink was likewise produced using a dye containing large amounts of a starting material, intermediates, byproducts and inorganic salts before production, and likewise evaluated. The results were (A) evaluation of an image; ○, (B) evaluation of moisture resistance; ⊙, (C) evaluation of light fastness; ⊙, (D) evaluation of storage stability of ink; Δ and (E) evaluation of a state of a printer nozzle; X.

Incidentally, the ink containing the dye produced by the simple process of the application was, when used in an ink jet recording liquid in particular, excellent in storage stability of ink and jet stability from a printer nozzle.

Examples 42 to 70

Production of dyes and production of inks were conducted by the processes described in Example 38 using dyes shown in Table 1. The results are shown in Table 8.

TABLE 8

| EXAMPLE NO. | DYE NO. | A | B | C | D | E |
|---|---|---|---|---|---|---|
| 42 | 1 | ⊙ | ⊙ | ⊙ | ⊙ | ○ |
| 43 | 2 | ⊙ | ⊙ | ⊙ | ⊙ | ○ |
| 44 | 3 | ⊙ | ⊙ | ⊙ | ⊙ | ○ |
| 45 | 4 | ⊙ | ○ | ⊙ | ⊙ | ○ |
| 46 | 5 | ⊙ | ○ | ⊙ | ⊙ | ○ |
| 47 | 7 | ⊙ | ⊙ | ⊙ | ⊙ | ○ |
| 48 | 8 | ⊙ | ⊙ | ⊙ | ⊙ | ○ |
| 49 | 9 | ⊙ | ⊙ | ⊙ | ⊙ | ○ |
| 50 | 10 | ⊙ | ⊙ | ⊙ | ⊙ | ○ |
| 51 | 11 | ⊙ | ○ | ⊙ | ⊙ | ○ |
| 52 | 12 | ⊙ | ○ | ⊙ | ⊙ | ○ |
| 53 | 14 | ⊙ | ⊙ | ⊙ | ⊙ | ○ |
| 54 | 16 | ⊙ | ⊙ | ⊙ | ⊙ | ○ |
| 55 | 20 | ⊙ | ⊙ | ⊙ | ⊙ | ○ |
| 56 | 25 | ⊙ | ⊙ | ⊙ | ⊙ | ○ |
| 57 | 28 | ⊙ | ⊙ | ⊙ | ⊙ | ○ |
| 58 | 29 | ⊙ | ⊙ | ⊙ | ⊙ | ○ |
| 59 | 31 | ⊙ | ⊙ | ⊙ | ⊙ | ○ |
| 60 | 32 | ⊙ | ⊙ | ⊙ | ⊙ | ○ |
| 61 | 33 | ⊙ | ⊙ | ⊙ | ⊙ | ○ |
| 62 | 35 | ⊙ | ○ | ⊙ | ⊙ | ○ |
| 63 | 36 | ⊙ | ⊙ | ⊙ | ⊙ | ○ |
| 64 | 37 | ⊙ | ⊙ | ⊙ | ⊙ | ○ |
| 65 | 38 | ⊙ | ⊙ | ⊙ | ⊙ | ○ |
| 66 | 39 | ⊙ | ⊙ | ⊙ | ⊙ | ○ |
| 67 | 40 | ⊙ | ⊙ | ⊙ | ⊙ | ○ |
| 68 | 42 | ⊙ | ○ | ⊙ | ⊙ | ○ |
| 69 | 43 | ⊙ | ⊙ | ⊙ | ⊙ | ○ |
| 70 | 45 | ⊙ | ⊙ | ⊙ | ⊙ | ○ |

Example 71

<Production of Ink>

According to the following formulation using dye No. 46 in Table 1 after purification as produced in Example 1 and dye No. 30 in Table 1 after purification as produced in Example 2, the compounds were mixed and dissolved, and the mixture was filtered with a Teflon filter having a pore diameter of 0.45 micron to produce ink.

<Formulation of ink>

| | |
|---|---|
| dye No. 46 in Table 1 after purification | 1.5 parts |
| dye No. 30 in Table 1 after purification | 1.5 parts |
| diethylene glycol | 30 parts |
| N-methyl-2-pyrrolidone | 10 parts |
| deionized water | 57 parts |

<Evaluation of Properties>

Properties were evaluated by the methods described in Example 1 using the foregoing ink. The results were good, namely, (A) evaluation of an image; ⊙, (B) evaluation of moisture resistance; ⊙, (C) evaluation of light fastness; ⊙, (D) evaluation of storage stability of ink; ○ and (E) evaluation of a state of a printer nozzle; ○.

Meanwhile, ink was produced in the foregoing manner except using dye No. 30 and No. 46 in Table 1 before purification containing large amounts of inorganic salts before production, and likewise evaluated. The results were (A) evaluation of an image; ○, (B) evaluation of moisture resistance; ⊙. (C) evaluation of light fastness; ⊙, (D) evaluation of storage stability of ink; Δ and (E) evaluation of a state of a printer nozzle; X.

Incidentally, the ink containing the dye in which the impurities were reduced by the simple process of the invention was, when used in an ink jet recording liquid in particular, excellent in storage stability of ink and jet stability from a printer nozzle.

Incidentally, a color tone was evaluated according to JIS Z-8729. Consequently, the ink had a delicately different color tone in comparison with the ink made of dye No. 46 or 30 in Table 1 alone.

Example 72

<Production of Ink>

According to the following formulation using dye No. 46 in Table 1 after purification as produced in Example 39 and dye No. 30 in Table 1 after purification as produced in Example 40, the compounds were mixed and dissolved, and the mixture was filtered with a Teflon filter having a pore diameter of 0.45 micron to produce ink.

<Formulation of ink>

| | |
|---|---|
| dye No. 46 in Table 1 after purification | 1.5 parts |
| dye No. 30 in Table 1 after purification | 1.5 parts |
| diethylene glycol | 30 parts |
| N-methyl-2-pyrrolidone | 10 parts |
| deionized water | 57 parts |

<Evaluation of Properties>

Properties were evaluated by the methods described in Example 1 using the foregoing ink. The results were good, namely, (A) evaluation of an image; ⊙, (B) evaluation of moisture resistance; ⊙, (C) evaluation of light fastness; ⊙, (D) evaluation of storage stability of ink; ⊙ and (E) evaluation of a state of a printer nozzle; ○.

Meanwhile, ink was produced in the foregoing manner using a mixed dye according to the foregoing formulation except using dye No. 30 and No. 46 in Table 1 before purification containing large amounts of inorganic salts before production, and likewise evaluated. The results were (A) evaluation of an image; ○, (B) evaluation of moisture resistance; ⊙, (C) evaluation of light fastness; ⊙, (D) evaluation of storage stability of ink; Δ and (E) evaluation of a state of a printer nozzle; X.

Incidentally, the ink containing the dyes produced by the simple process of the invention was, when used in an ink jet recording liquid in particular, excellent in storage stability of ink and jet stability from a printer nozzle.

Incidentally, a color tone was evaluated according to JIS Z-8729. Consequently, the ink had a delicately different color tone in comparison with the ink made of dye No. 46 or 30 in Table 1 alone.

Comparative Example 1

<Production of a Dye with an Organic Solvent>

Dye No. 46 in Table 1 was used, and dissolved in an organic solvent according to an inorganic salt removal method. Thus, the dye was produced by a method to reduce inorganic salts and the like. Five parts of dye No. 46 in Table 1 was added to 50 parts of N,N-dimethylformamide. However, the dye was not dissolved. The dye in a dispersed state was separated by filtration, and dried. Analytical values of the dye are shown in Table 10. As a result, the content of an inorganic salt such as NaCl or the like was not reduced, and further, impurities such as a starting material used for production of the dye, intermediates or byproducts formed during production and the like could not be reduced either. Thus, the dye could not be produced by the simple process of the invention.

TABLE 10

|  | Content (%) of NaCl |
|---|---|
| Dye No. 46 in Table 1 before purification | 15.5 |
| Dye No. 46 in Table 1 after purification | 15.4 |

Moreover, a dissolution test was performed using other organic solvents. However, the dye was not dissolved either as in using N,N-dimethylformamide. This is because the dye possesses such qualities that it has high solubility in water but almost no solubility in an organic solvent. Thus, production was impossible by a method of dissolving a dye in an organic solvent to remove inorganic salts, which is a general method.

Comparative Example 2
<Production of a Dye with an Organic Solvent>
Five parts of a dye represented by formula (d) was added to 50 parts of N,N-dimethylformamide, and dissolved therein. An insoluble matter was separated by filtration, and a filtrate was dried. As a result, 2 parts of the dye purified with the organic solvent was obtained. Analytical values of the dye are shown in Table 11. Consequently, the content of an inorganic salt such as NaCl or the like was reduced.

TABLE 11

(d)

|  | Content (%) of NaCl |
|---|---|
| Dye of the formula (d) before purification | 20.5 |
| Dye of the formula (d) after purification | 3.5 |

Ink was produced according to the process for producing ink in Example 1 using 5 parts of the dye of formula (d) after purification as produced above, and properties were likewise evaluated. The results were extremely bad in comparison with the aqueous ink of the invention, namely, (A) evaluation of an image; ○, (B) evaluation of moisture resistance; X, (C) evaluation of light fastness; Δ, (D) evaluation of storage stability of ink; ○ and (E) evaluation of a state of a printer nozzle; Δ.

Industrial Applicability

The aqueous ink containing the dye produced by the simple process of the invention exhibits excellent properties in light fastness, moisture resistance and storage stability. When the ink was used in a recording liquid of an ink jet recording system, it is important that contents of inorganic salts are minimized and impurities such as intermediates or byproducts formed during production and the like are also reduced. They can be attained by the process of the invention simply and effectively. Consequently, the aqueous ink can be provided in which clogging of a printer head is eliminated, formation of a high-quality image without blotting is enabled and a recorded image has also excellent properties in light fastness, moisture resistance and storage stability.

What is claimed is:
1. Aqueous ink for ink jet recording comprising a coloring matter and an aqueous medium, in which at least one of dyes represented by the formula (A) or a salt thereof is contained as the coloring matter

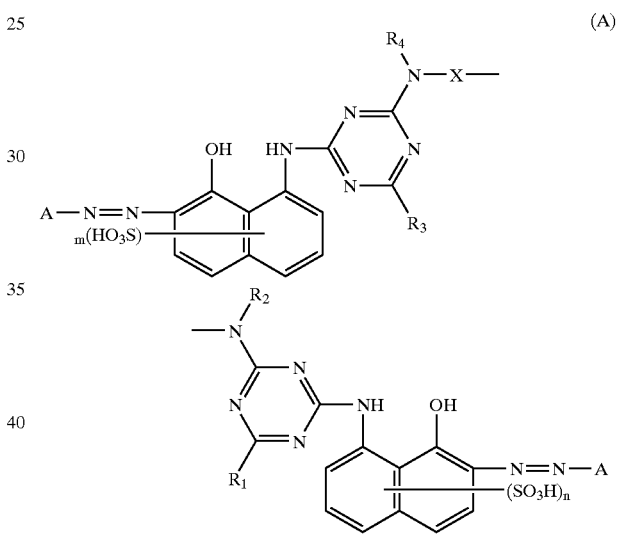

wherein $R_1$ and $R_3$, independently from each other, represent a hydrogen atom, a hydroxyl group or a halogen atom, $R_2$ and $R_4$, independently from each other, represent a hydrogen atom, an optionally substituted alkyl group, an optionally substituted aryl group or an optionally substituted aralkyl group, A represents a phenyl group or a naphthyl group, wherein the phenyl group or the naphthyl group may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group, X represents a divalent bonding group represented by the formula (2)

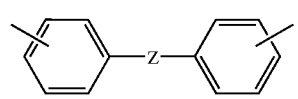

in which Z represents —CO—, —NHCONH—, —NHCSNH— or formula (3)

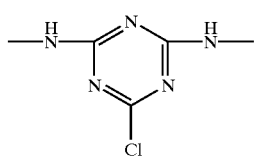

wherein the divalent bonding group may be substituted with a halogen atom, an alkyl group, an alkoxy group, a hydroxyl group, an amino group, a carboxyl group or a sulfonic acid group, and m and n, independently from each other, represent an integer of 1 to 4.

2. The aqueous ink for ink jet recording according to claim 1, wherein in the formula (A), at least one of $R_1$ and $R_3$ is a halogen atom.

3. Aqueous ink for ink jet recording comprising a coloring matter and an aqueous medium, in which the dye represented by the formula (B) or a salt thereof is contained as the coloring matter atom, an optionally substituted alkyl group, an optionally substituted aryl group or an optionally substituted aralkyl group, A represents a phenyl group or a napthyl group, wherein the phenyl group or the naphthyl group may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group, X represents a divalent bonding group represented by the formula (2)

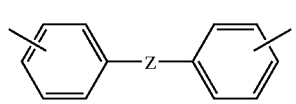

in which Z represents —CO—, —NHCONH—, —NHCSNH— or formula (3)

(B)

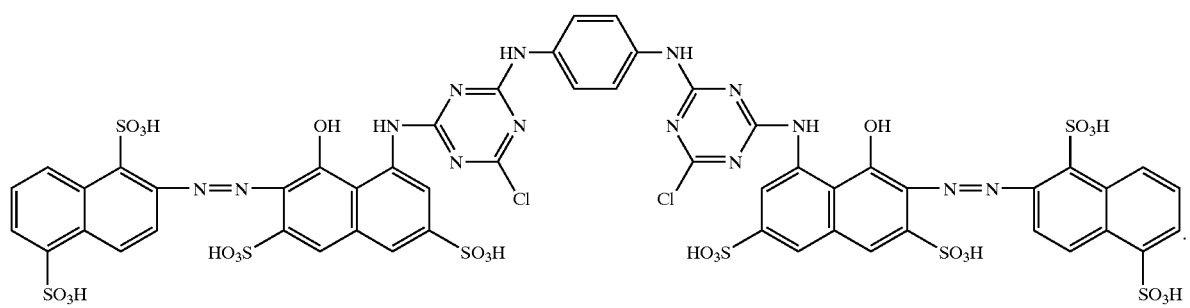

4. Aqueous ink for ink jet recording, according to claim 3, further comprising a dye represented by the formula (A) or a salt thereof (A)

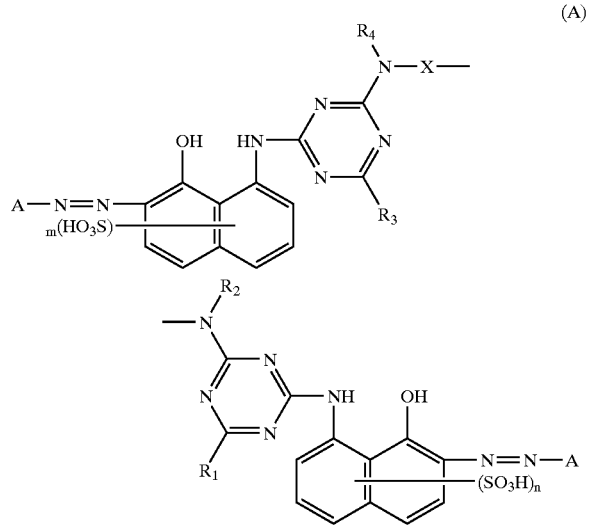

wherein $R_1$ and $R_3$, independently from each other, represent a hydrogen atom, a hydroxyl group or a halogen atom, $R_2$ and $R_4$, independently from each other, represent a hydrogen

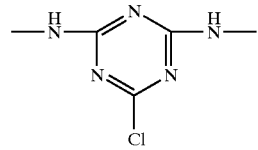

wherein the divalent bonding group may be substituted with a halogen atom, an alkyl group, an alkoxy group, a hydroxyl group, an amino group, a carboxyl group or a sulfonic acid group, and m and n, independently from each other, represent an integer of 1 to 4.

5. A process for producing a dye, which comprises dissolving a dye represented by the formula (A) or a salt thereof in water to form an aqueous solution, and adjusting pH of the aqueous solution to 9 or more to remove insoluble matters formed

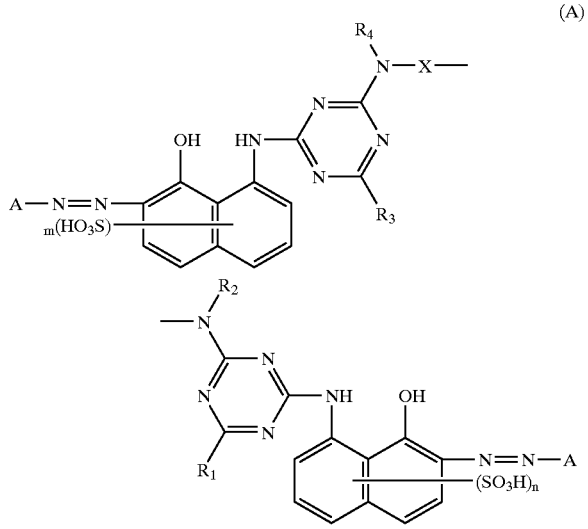

wherein $R_1$ and $R_3$, independently from each other, represent a hydrogen atom, a hydroxyl group or a halogen atom, $R_2$ and $R_4$, independently from each other, represent a hydrogen atom, an optionally substituted alkyl group, an optionally substituted aryl group or an optionally substituted aralkyl group, A represents a phenyl group or a naphthyl group, wherein the phenyl group or the naphthyl group may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group, X represents a divalent bonding group represented by the formula (2)

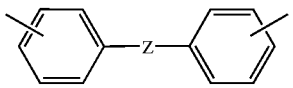

(2)

in which Z represents —CO—, —NHCONH—, —NHCSNH— or formula (3)

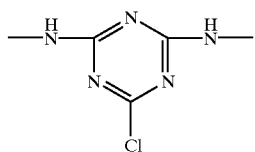

(3)

wherein the divalent bonding group may be substituted with a halogen atom, an alkyl group, an alkoxy group, a hydroxyl group, an amino group, a carboxyl group or a sulfonic acid group, and m and n, independently from each other, represent an integer of 1 to 4.

6. The process for producing a dye according to claim 5, which further comprises, after dissolving the dye represented by the formula (A) or a salt thereof in water to form the aqueous solution, mixing the aqueous solution with a water-soluble organic solvent to crystallize the dye.

7. The process for producing a dye according to claim 5, which further comprises mixing the aqueous solution obtained by dissolving the dye represented by the formula (A) or a salt thereof in water and adjusting pH of the aqueous solution to 9 or more to remove insoluble matters formed, with a water-soluble organic solvent to crystallize the dye.

8. The process for producing the dye according to claim 7, wherein in the formula (A), A is a naphthyl group, wherein the naphthyl group may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group.

9. A process for producing a dye, which comprises dissolving the dye represented by the formula (B) or a salt thereof in water to form an aqueous solution, and adjusting pH of the aqueous solution to 9 or more to remove insoluble matters formed, and mixing the aqueous solution thus obtained with a water-soluble organic solvent to crystallize the dye

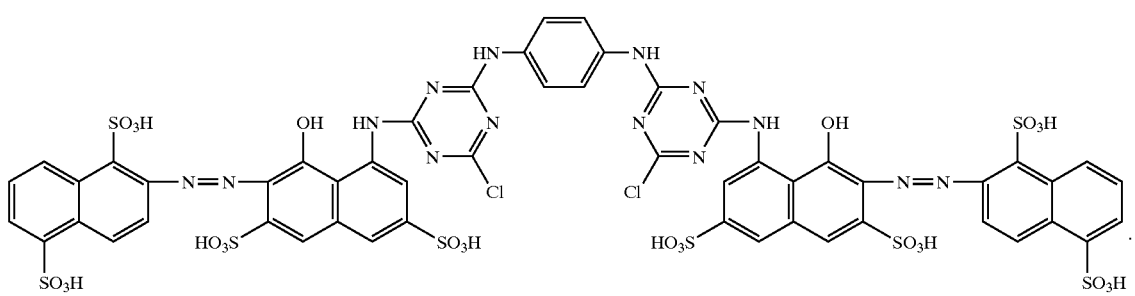

(B)

10. Aqueous ink for ink jet recording, wherein the ink comprises at least one dye produced by the process according to claim 9.

11. The aqueous ink for ink jet recording according to claim 2, wherein in the formula (A), A is a naphthyl group, wherein the naphthyl group may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group.

12. The aqueous ink for ink jet recording according to claim 1, wherein in the formula (A), A is a naphthyl group, wherein the naphthyl group may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group.

13. The process for producing the dye according to claim 6, wherein in the formula (A), A is a naphthyl group, wherein the naphthyl group may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group.

14. The process for producing the dye according to claim 5, wherein in the formula (A), A is a naphthyl group, wherein the naphthyl group may be substituted with any of a halogen atom, a hydroxyl group, an amino group, an optionally substituted alkyl group, an alkoxy group, a carboxyl group, a carboxylic acid ester group, a carboxylic acid amide group, a sulfonic acid group and a sulfonic acid amide group.

15. A process for producing a dye, which comprises dissolving the dye represented by the formula (B) or a salt thereof in water to form an aqueous solution, and thereafter mixing the aqueous solution with a water-soluble organic solvent to crystallize the dye 22. Aqueous ink for ink jet recording, wherein the ink comprises at least one dye produced by the process according to claim 15.

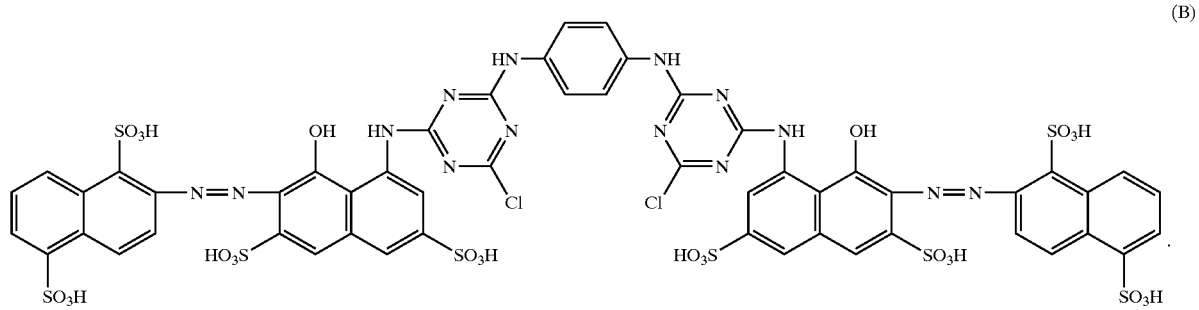

(B)

16. A process for producing a dye, which comprises dissolving a dye represented by the formula (B) or a salt thereof in water to form an aqueous solution, and adjusting pH of the aqueous solution to 9 or more to remove insoluble matters formed 23. Aqueous ink for ink jet recording, wherein the ink comprises at least one dye produced by the process according to claim 14.

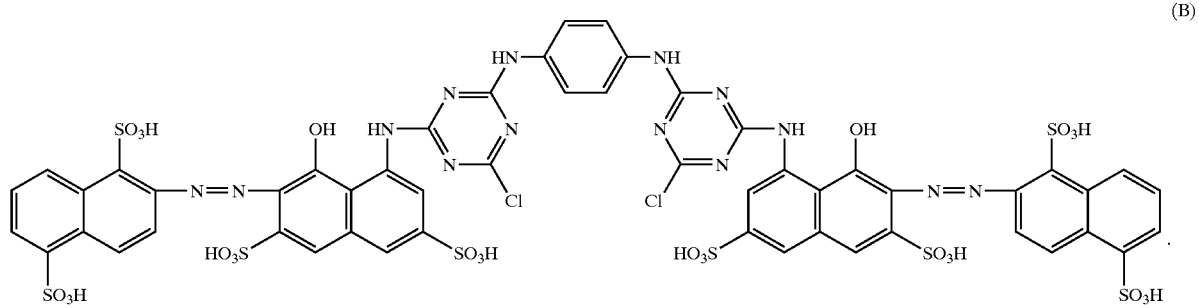

(B)

17. Aqueous ink for ink jet recording, wherein the ink comprises at least one dye produced by the process according to claim 8.

18. Aqueous ink for ink jet recording, wherein the ink comprises at least one dye produced by the process according to claim 7.

19. Aqueous ink for ink jet recording, wherein the ink comprises at least one dye produced by the process according to claim 6.

24. Aqueous ink for ink jet recording, wherein the ink comprises at least one dye produced by the process according to claim 13.

25. An aqueous ink for ink jet recording, comprising a dye represented by the formula (D) and an aqueous medium:

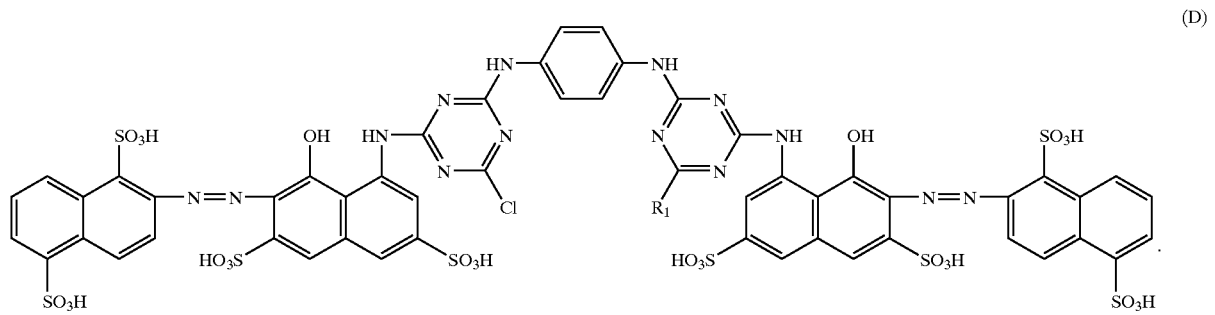

(D)

20. Aqueous ink for ink jet recording, wherein the ink comprises at least one dye produced by the process according to claim 5.

21. Aqueous ink for ink jet recording, wherein the ink comprises at least one dye produced by the process according to claim 16.

wherein $R_1$ and $R_3$ independently represent a hydroxyl group or a chlorine atom, with the proviso that $R_1$ and $R_3$ are not simultaneously a hydroxyl group.

* * * * *